(12) United States Patent
Diab et al.

(10) Patent No.: US 8,804,578 B2
(45) Date of Patent: Aug. 12, 2014

(54) METHOD AND SYSTEM FOR JITTER AND FRAME BALANCE AND/OR REBALANCE FOR EEE REFRESH CYCLES

(75) Inventors: Wael William Diab, San Francisco, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 12/493,574

(22) Filed: Jun. 29, 2009

(65) Prior Publication Data

US 2010/0329108 A1    Dec. 30, 2010

(51) Int. Cl.
*H04B 7/005* (2006.01)

(52) U.S. Cl.
USPC .......................................... 370/278; 370/515

(58) Field of Classification Search
USPC ............ 370/395.62, 503–520, 268, 269, 278, 370/286–292; 375/354–376, 285, 144, 148, 375/226, 346, 348; 709/248, 231–234; 714/707, 731, 744, 775, 789, 798; 455/1, 63.1, 114.2, 278.1, 296; 379/145, 416
See application file for complete search history.

(56) References Cited

U.S. PATENT DOCUMENTS

| | | | |
|---|---|---|---|
| 4,646,287 A * | 2/1987 | Larson et al. ................. | 370/505 |
| 5,315,618 A * | 5/1994 | Yoshida ........................ | 375/371 |
| 5,812,936 A * | 9/1998 | DeMont ........................ | 455/63.1 |
| RE38,309 E * | 11/2003 | Frazier et al. ................. | 709/232 |
| 6,795,450 B1 | 9/2004 | Mills et al. | |
| 7,529,275 B2 * | 5/2009 | Sridharan et al. ............. | 370/514 |
| 7,787,498 B2 * | 8/2010 | Fourcand ...................... | 370/503 |
| 8,156,359 B1 * | 4/2012 | Sedarat et al. ................ | 370/278 |
| 8,270,389 B2 * | 9/2012 | Parnaby ........................ | 370/503 |
| 2003/0235214 A1 * | 12/2003 | Leroux et al. ................. | 370/504 |
| 2005/0135501 A1 * | 6/2005 | Chang et al. .................. | 375/376 |
| 2006/0023771 A1 * | 2/2006 | Johnson et al. ............... | 375/366 |
| 2006/0034295 A1 | 2/2006 | Cherukuri et al. | |
| 2007/0019718 A1 * | 1/2007 | Heise ............................ | 375/285 |
| 2007/0280239 A1 | 12/2007 | Lund | |
| 2008/0317185 A1 * | 12/2008 | Mueller et al. ............... | 375/376 |
| 2009/0125735 A1 * | 5/2009 | Zimmerman ................. | 370/503 |
| 2010/0104056 A1 * | 4/2010 | Taich et al. ................... | 375/359 |
| 2010/0115374 A1 * | 5/2010 | Kirkby ......................... | 375/354 |
| 2011/0264808 A1 * | 10/2011 | Eriksson ...................... | 709/248 |

* cited by examiner

*Primary Examiner* — Jeffrey M Rutkowski
(74) *Attorney, Agent, or Firm* — Oblon, Spivak, McClelland, Maier & Neustadt, L.L.P.

(57) ABSTRACT

Ethernet network link partners may be configured for operation in a low power mode. The link partners may generate new frames and/or signals and/or may modify characteristics of existing frames and/or signals to be communicated via one or more channels of an Ethernet link during the low power mode. The new and/or modified frames and/or signals may be utilized as refresh frames and/or signals to control communication during low power mode and/or to enable refresh and/or synchronization of the link partners. The new and/or modified frames and/or signals may be generated and/or modified based on a desired frequency distribution and/or spectral density. New and/or modified frames and/or signals may comprise jitter, random and/or pseudo random bit patterns and/or varied bit patterns and/or energy levels. Data packets and/or active idle symbols may be forced during low power mode to mitigate undesired periodic energy.

21 Claims, 8 Drawing Sheets

METHOD AND SYSTEM FOR JITTER AND FRAME BALANCE AND/OR REBALANCE FOR EEE REFRESH CYCLES

CROSS-REFERENCE TO RELATED APPLICATIONS/INCORPORATION BY REFERENCE

[NA]

FIELD OF THE INVENTION

Certain embodiments of the invention relate to networking. More specifically, certain embodiments of the invention relate to a method and system for jitter and frame balance and/or rebalance for EEE refresh cycles.

BACKGROUND OF THE INVENTION

Communications networks, and in particular Ethernet networks, are becoming an increasingly popular means of exchanging data of various types and sizes for a variety of applications. In this regard, Ethernet networks are increasingly being utilized to carry voice, data, and multimedia traffic. Accordingly, more and more devices are being equipped to interface with Ethernet networks. Broadband connectivity including Internet, cable, phone and voice over IP (VOIP) offered by service providers has led to increased traffic and more recently, migration to Ethernet networking. Much of the demand for Ethernet connectivity is driven by a shift to electronic lifestyles involving desktop computers, laptop computers, and various handheld communication devices such as smart phones and PDA's. Applications such as search engines, reservation systems and video on demand (VOD) that may be offered at all hours of a day and seven days a week, have become increasingly popular.

These recent developments have led to increased demand for data aggregation and high performance computing (HPC), and also increased demand on datacenter, and/or core networking resources. As the number of devices connected to data networks increases and demand for higher bandwidths increases, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for jitter and frame balance and/or rebalance for EEE refresh cycles, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for jitter and frame balance and/or rebalance for EEE refresh cycles. Link partners in an Ethernet network that are coupled via an Ethernet link may enter a low power idl (LPI) mode of operation. During the LPI mode, one or more new frames and/or new signals may be generated. Furthermore, one or more characteristics of existing frames and/or existing signals may be modified. The generated new frames and/or signals and/or the modified existing frames and/or signals may be communicated by one or more of the link partners over the Ethernet link. One or more of the link partners may utilize the generated one or more new frames and/or new signals, and/or the modified one or more existing frames and/or existing signals to control communication over the Ethernet link during the low power idle mode of operation. The generated one or more new frames and/or signals, and/or the modified one or more existing frames and/or signals may comprise LPI mode idle frames and/or LPI mode idle signals. Moreover, the one or more link partners may be enabled to synchronize and/or refresh one or more of their corresponding circuits based on the generated one or more new frames and/or signals, and/or on the modified one or more existing frames and/or signals.

Aspects of an exemplary embodiment of the invention may comprise mitigating periodic undesired energy in the existing frames and/or existing signals. In this regard, the generation of the new frames and/or new signals, and/or the modifying of existing frames and/or existing signals may be based on a desired frequency distribution and/or a spectral density. For example, jitter may be applied to the existing frames and/or existing signals. Moreover, the new frames and/or new signals and/or the modified existing frames and/or existing signals may comprise a random bit pattern and/or a pseudo random bit pattern. Furthermore, bit patterns and/or energy levels among the generated one or more new frames and/or new signals, and/or the modified one or more existing frames and/or existing signals may be varied. In an exemplary embodiment of the invention, one or more forced data packets and/or forced active idle symbols may be communicated over the Ethernet link during the communication of the new frames and/or new signals and/or the modified existing frames and/or existing signals. Other exemplary aspects of the invention comprise configuring one or more of the link partners for operation in the low power idle mode of operation. In this manner, circuitry that corresponds to an active channel may receive less noise from other channels that may be operating in LPI mode. Exemplary embodiments of the invention may utilize one or more correction schemes comprising forward error correction (FEC), 802.1ae MACsec, time synchronization and/or IEEE 1588 Precision Clock Synchronization Protocol for Networked Measurement and Control Systems.

Figure 1:
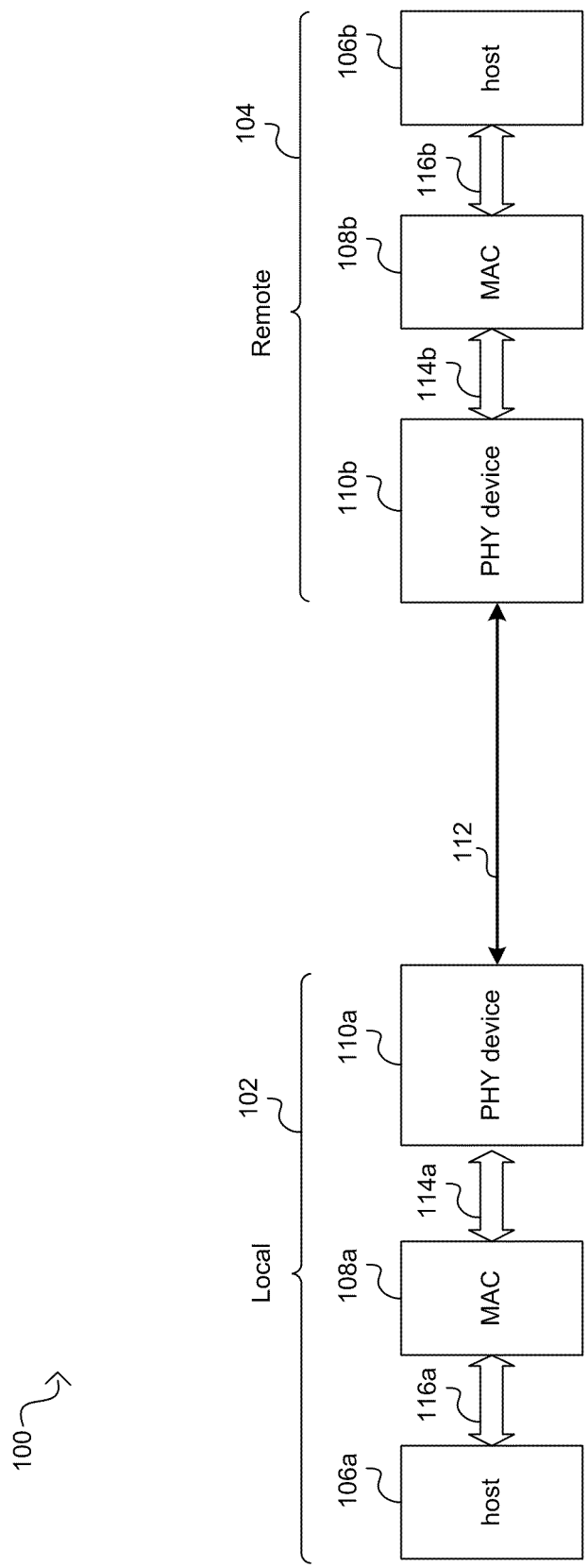
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. In addition, there is shown two hosts 106a and 106b, two MAC controllers 108a and 108b, two PHY devices 110a and 110b, two controllers 114a and 114b, two bus controller interfaces 116a and 116b and a link 112

The network devices 102 and 104 may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10 GBASE-T may utilize four pairs of UTP. In this regard, however, aspects of the invention may enable varying the number of physical channels via which data is communicated.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In another exemplary embodiment of the invention, the network devices 102 and/or 104 may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In another exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

One or both of the PHY devices 110a and 110b may be operable to communicate asymmetrically. In this regard, the PHY devices may support transmission and/or reception at a high(er) data rate in one direction and transmission and/or reception at a low(er) data rate in the other direction. In an exemplary embodiment of the invention, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates and may not transmit data for various periods of time. In some instances, when data is not being sent in one direction on a link or in instances when data is not be sent via a subset of channels in the link, a PHY device may transmit LPI idle frames and/or signals via the silent link and/or channels in order to refresh the PHY device and/or its link partner. In this regard, periodic elements in the LPI idle frames and/or signals may introduce unwanted interference, EMI and/or noise on the receiver side of the PHY device on the active link. The receiver interference may be reduced by modifying the LPI idle frames and/or signals such that interference and/or communication impairments may be avoided. For example, jitter may be introduced and/or frames and/or signals that comprise non-interfering signal characteristics may be utilized to refresh circuitry.

The network device 102 may comprise a host 106a, a medium access control (MAC) controller 108a, and a PHY device 104a. The network device 104 may comprise a host 106b, a MAC controller 108b, and a PHY device 110b. Notwithstanding, the invention is not limited in this regard. In various embodiments of the invention, the network device 102 and/or 104 may comprise, for example, one or more of a switch, end point, router, computer systems and/or audio/video (A/V) enabled equipment. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the network device 102 and the network device 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation. The PHY devices 110a and 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY devices 110a and 110b may also support autonegotiation, which may for example, be utilized to identify and/or select communication parameters such as speed and duplex mode.

In various embodiments of the invention, the PHY devices 110a and 110b may comprise suitable logic, circuitry, and/or code that may enable transmission and/or reception at a high (er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low (er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3.

In an exemplary embodiment of the invention illustrated in FIG. 1, the hosts 106a and 106b may implement layer 3 and above, the MAC controllers 108a and 108b may implement layer 2 and above and the PHY devices 110a and 110b may implement the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may comprise data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces. The interfaces 114a and/or 114 by may comprise media independent interfaces (MII). In addition the interfaces 114a and/or 114b may comprise a management data input output (MDIO) interface that may be operable to communicate control plane information between the MAC controller 108a and the PHY device 110a, for example. In this regard, the host 106 may be operable to access registers within the PHY device 110 via the MDIO bus. The registers may comprise configuration parameters for the PHY device 110a. The bus controller interfaces 116a and 116b may correspond to PCI or PCI-X interfaces. Notwithstanding, the invention is not limited in this regard.

In instances when the network device 200 may be in an active state and there is no data available to transmit, the network device 200 may transmit active state IDLE symbols to a remote link partner. The IDLE symbols may keep the local and/or the remote partners "trained".

In operation, the PHY devices 110a and 110b may be operable to support one or more energy efficient Ethernet EEE techniques. In this regard, an EEE control policy may determine how and/or when to configure and/or reconfigure the PHY devices 110a and 110b to enter or exit a low(er) power mode. Exemplary power level modes may comprise a low power idle (LPI) mode, a sub-rate mode in which the network device may communicate less than a negotiated maximum data rate and/or a sub-set mode wherein circuitry corresponding to a portion of channels on a link may be silent and/or operating in a lower power mode. In asymmetric systems, devices that handle one direction of communication may be in a low power mode independent of devices that may handle communication in an opposite direction. In synchronous systems, both transmit and receive sides of a PHY device may enter and/or leave a low power mode together. Although a PHY device may operate in a synchronous mode, OSI layers above the PHY may operate in an asymmetric mode.

During an exemplary low power level mode, signals and/or frames may be transmitted and/or received by one or both of the link partners 102 and 104 to synchronize with a link partner and/or to refresh circuitry. Periodic elements within the refresh frames and/or signals may introduce unwanted interference in the active portions of the link partners. In various embodiments of the invention, the refresh frames and/or signals may be generated in such a way that may enable a reduction of the interference, EMI and/or noise. For example, jitter may be introduced when sending the LPI idle frames and/or signals. Moreover, the refresh frames and/or signals that comprise non-interfering signal characteristics may be utilized to refresh circuitry. In this regard, refresh frames and/or signals may be chosen and/or processed so that the frames and/or signals comprise a balanced and/or a specified frequency content that may not cause interference. In various embodiments of the invention, one or more of forward error correction (FEC), 802.1ae MACsec, time synchronization and/or IEEE 1588 Precision Clock Synchronization Protocol for Networked Measurement and Control Systems may be utilized.

Figure 2:
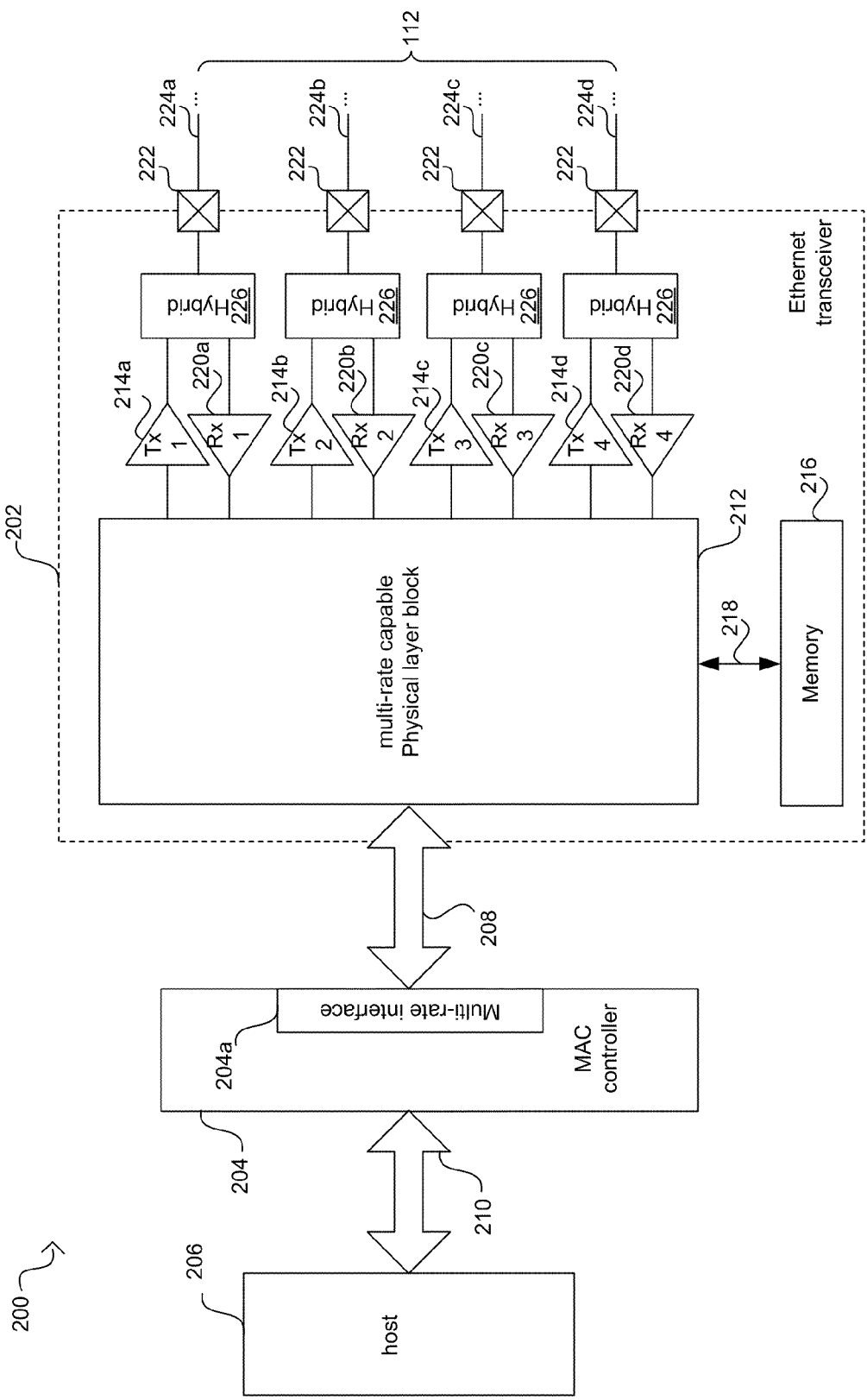
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and/or 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement, for example, a different communication protocol. These communication modes may include, but are not limited to, Ethernet over twisted pair standards 10BASE-T, 100BASE-TX, 1000BASE-T, 10 GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, interfaces and/or code that may enable transmission of data from the network device 200 to a remote network device via, for example, the link 112 in FIG. 1. The receivers 220a, 220b, 220c, 220d may comprise suitable logic, circuitry, interfaces and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel. During periods of LPI that may occur in one or more of the transmitters 214a, 214b, 214c and 214d, the PHY device 202 may transmit LPI idle frames and/or signals via the one or more LPI transmitters and the corresponding one or more of physical channels 224a, 224b, 224c and 224d. In this regard, the LPI idle frames and/or signals may be generated in a way that may reduce interference in the receivers 220a, 220b 220c and/or 220d. For example, the PHY device 202 may be operable to introduce jitter and/or may modify signal characteristics of the LPI idle frames and/or signals.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

The PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, interface and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

In operation, the network device 200 may communicate with a remote partner via the link 112. For example, for 10 Gbps Ethernet, the network device 200 may transmit data to and receive data from a remote partner via the physical channels 224a, 224b, 224c, and 224d. In this regard, when there is no data for the network device 200 to transmit, then it may transmit active state IDLE symbols to keep itself and/or the remote partner "trained". In this manner, power consumption of a network may be largely independent of the amount of actual data being transmitted over the network. Accordingly, controlling the data rate limit on the link 112 may enable the network devices 200 to transmit fewer active state IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. A channel in a low(er) power state may operate in one or more ways. For example, one or more channels may convey little or no data, they may be silent, may convey LPI idle frames.

During periods of low link utilization, the PHY device 202 and/or one or more components implementing layers above the PHY layer may be placed in a low power idle mode (LPI) wherein the PHY device 202 and/or higher level components may consume less power. During LPI mode, the PHY device 202 may cycle between quiet intervals and refresh intervals. The refresh intervals may be separated by large intervals of inactivity referred to as quiet intervals. During quiet intervals, portions of the transmitter and/or receiver circuitry may be turned off. During refresh intervals, the PHY device 202 may maintain various coefficients and may maintain synchronization to allow for a more rapid return to an active state. In this regard, the PHY device 202 may transmit and/or receive low density parity check (LDPC) frames during refresh intervals although the invention is not so limited. For example, the PHY device 202 may transmit physical signaling and/or control characters during refresh intervals. In various embodiments of the invention, interference that may be introduced into the PHY device 202 by various frequency components of the LPI refresh frames and/or signals may be reduced. In this regard, periodic elements of the LPI refresh frames and/or signals may be modified such that interference and/or communication impairments may be avoided. For example, jitter may be introduced to reduce periodicity in the LPI idle frames and/or signals. Moreover, LPI idle frames and/or signals that do not comprise the interfering periodic elements may be utilized.

Figure 3:
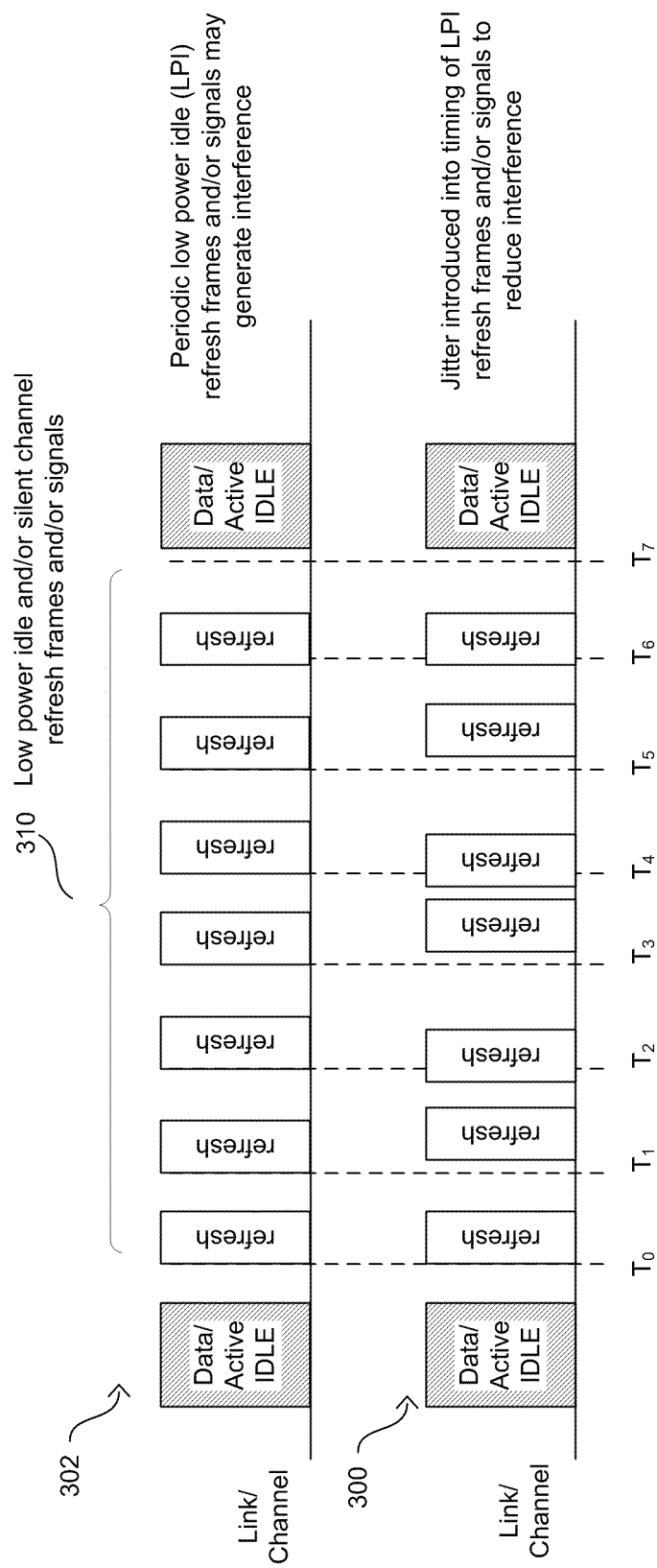
FIG. 3 is a block diagram illustrating exemplary jitter applied to timing of frames and/or signals during LPI mode and/or silent channel refresh intervals, in accordance with an embodiment of the invention.

FIG. 3 is a block diagram illustrating exemplary jitter applied to timing of frames and/or signals during LPI mode and/or silent channel refresh intervals, in accordance with an embodiment of the invention. Referring to FIG. 3, there is shown, refresh frames and/or signals 302 and jittered refresh frames and/or signals 300. In this regard, one or both directions of one or more channels of the link 112 and/or the PHY device 202 may be in an LPI mode and/or a refresh mode. During the LPI mode and/or refresh mode, the PHY device 202 may cycle between quiet intervals and refresh intervals. During refresh intervals, frames and/or signals 302 may be transmitted by the PHY device 202 to a link partner via one or more channels of the link 112. For example, LPI idle signals, physical signaling and/or depleted frames such as LDPC frames that may be utilized in 10 GBASE-T may be transmitted during refresh intervals. The link partner may comprise the remote link partner 104 described with respect to FIG. 1. In instances when refresh frames and/or signals are transmitted on a regular basis, for example, at times $T_0, T_1, \ldots, T7$, the refresh frames and/or signals may interfere with one or both of the link partners that may be utilizing the link 112 or interfere with a neighboring link.

In various embodiments of the invention, the interference may be reduced and/or eliminated by varying transmission times of the refresh frames and/or intervals. For example, jitter may be applied to transmission times of the refresh frames and/or signals 300 wherein the refresh frames and/or signals 300 may be transmitted prior to and/or after regular transmission times $T_0, T_1, \ldots, T_7$. Moreover, jitter may be applied to the frequency, phase and/or amplitude of the refresh frames and/or signals 300. The applied jitter may reduce various frequency components of the refresh frames and/or signals 300 that may interfere with data reception. The jitter may be configurable and/or may be implemented via software, firmware and/or hardware. For example, one or more registers may be utilized to store a refresh rate and a random number generator may be utilized to determine a magnitude of deviations in jitter. The jitter may be applied to frames and/or signals, however, the invention is not so limited. For example, the jitter may be applied to other types of transmissions such as physical signaling and/or control characters that may be communicated by the PHY device 202 to a link partner. In this regard, the physical signaling and/or control characters may be utilized during a low(er) power mode. The applied jitter may reduce interference that may be caused by unwanted frequency components that may generated by periodic elements within the physical signaling and/or control characters. The PHY device 202 may apply jitter to LPI idle frames and/or signals to reduce interference along with other methods for reducing interference that are described with respect to FIG. 4, FIG. 5, FIG. 6 and/or FIG. 7.

Figure 4:
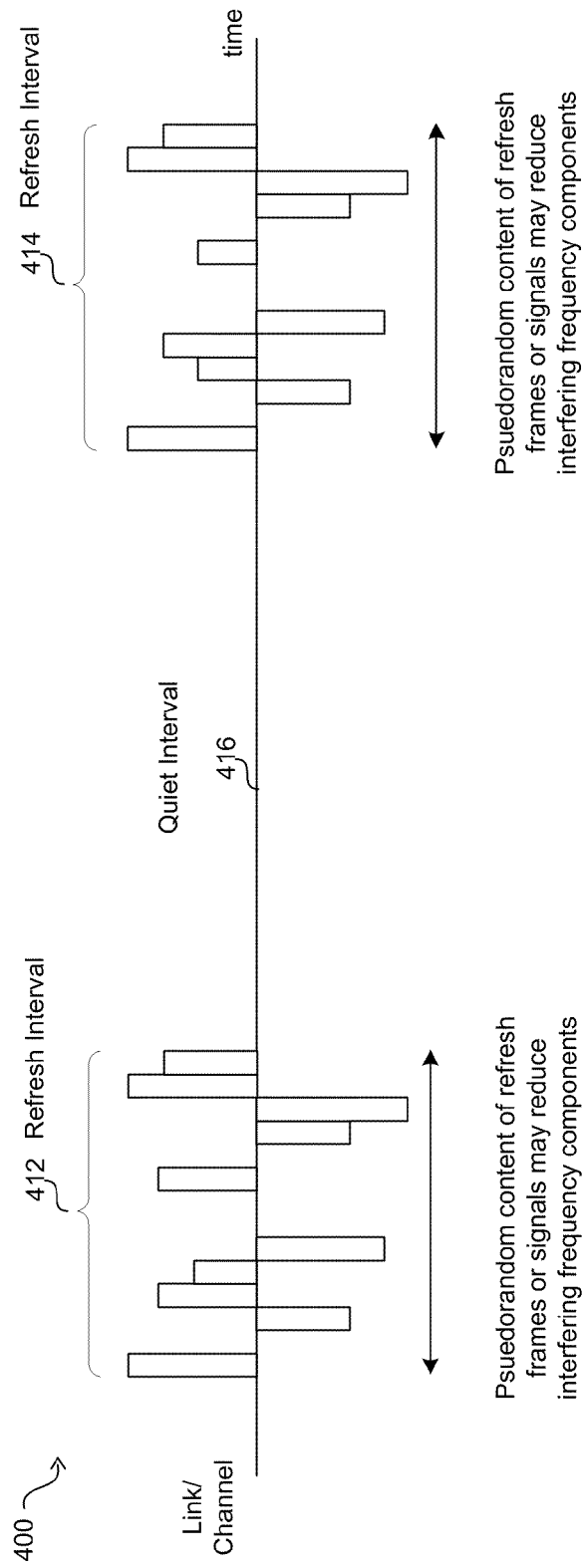
FIG. 4 is a block diagram illustrating exemplary refresh intervals comprising balanced and/or spread spectrum frames and/or signals, in accordance with an embodiment of the invention.

FIG. 4 is a block diagram illustrating exemplary refresh intervals comprising balanced and/or spread spectrum frames and/or signals, in accordance with an embodiment of the invention. Referring to FIG. 4 there is shown low(er) power mode intervals 400 comprising the refresh intervals 412 and 414 and the quiet interval 416.

Refresh frames and or signals of the low(er) power mode 400 may be transmitted by the PHY device 202 to a link partner via one or more channels and in one or both directions on the link 112. For example, the link partner may comprise the remote link partner 104 described with respect to FIG. 1. In this regard, the one or more channels and/or one or more directions of the PHY device 202 and/or the link partner may be operating in a low(er) power mode, for example, low power idle (LPI) mode and/or a subset PHY mode for example. The refresh intervals 412 and/or 414 may comprise LPI idle frames and/or signals that may be utilized to maintain synchronization and/or refresh circuitry during LPI mode, for example. In various embodiments of the invention, the frames and/or signals may comprise physical signals and/or depleted frames, for example, LDPC frames and/or other signals that may be transmitted during the refresh intervals 412 and/or 414. The refresh frames and/or signals may be chosen based on their spectral densities. For example, LDPC frames and/or signals that may comprise a more random and/or pseudo random frequency distribution that may be spread over a broad spectrum may not introduce unwanted spikes at a particular frequency. In this regard, interference to active channels may be mitigated or reduced.

In other embodiments of the invention, certain refresh frames and/or signals that may comprise frequency components above the noise floor may be chosen such that they may not impair communication on nearby active channels. For example, in instances when a nearby active receiver may not be sensitive to certain frequencies, refresh frames and/or signals with frequency components within the insensitive band may be chosen for the refresh signals during the refresh intervals 412 and/or 414 and may not impair data reception within the nearby active receiver. Other frequencies that the active receiver may be sensitive to be avoided. Various types of signals, for example, physical signals and/or control characters may be chosen based on their spectral densities and may be transmitted during the refresh intervals 412 and/or 414. The refresh frames and/or signals sent during the refresh intervals 412 and/or 414 may be configurable and/or may be adaptable. The PHY device 202 may utilize balanced and/or spread spectrum refresh frames and/or signals to reduce interference along with other methods for reducing interference that are described with respect to FIG. 3, FIG. 5, FIG. 6 and/or FIG. 7.

Figure 5:
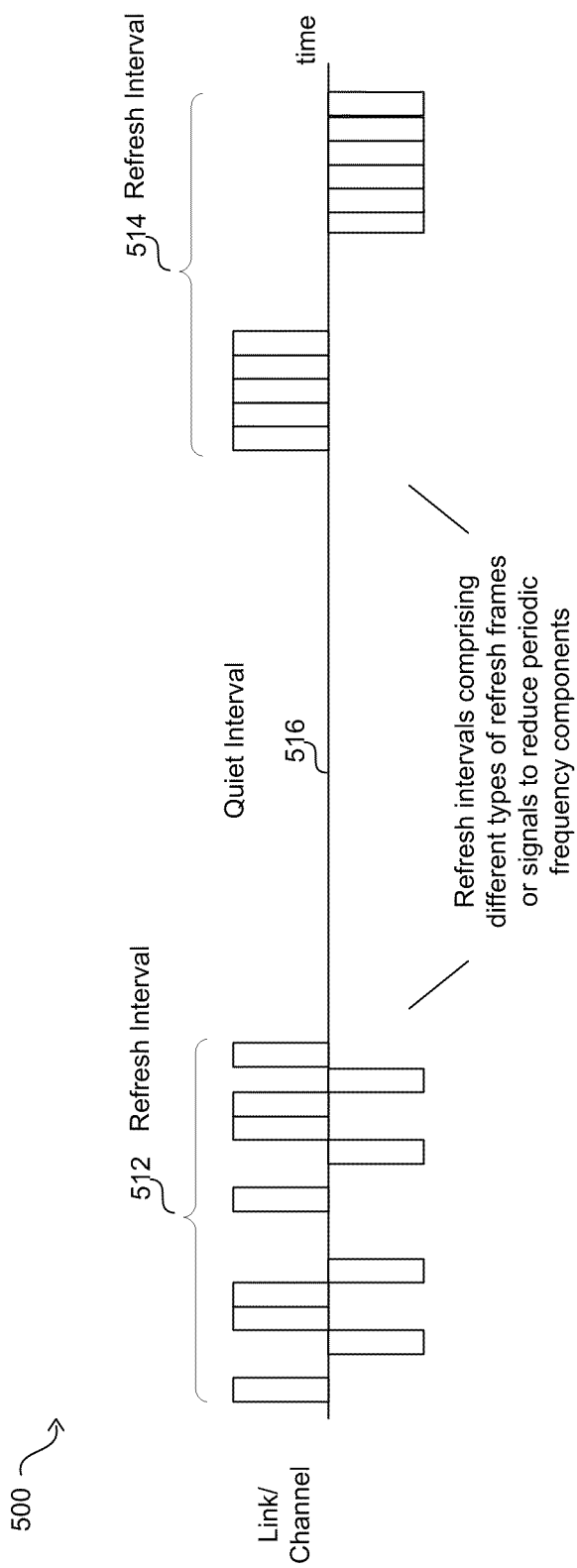
FIG. 5 is a block diagram illustrating exemplary refresh intervals comprising variations of refresh frames and/or signals, in accordance with an embodiment of the invention.

FIG. 5 is a block diagram illustrating exemplary refresh intervals comprising variations of refresh frames and/or signals, in accordance with an embodiment of the invention. Referring to FIG. 5 there is shown lower power mode 500 comprising refresh intervals 512 and 514 and a quiet interval 516.

Refresh frames and or signals of the low(er) power mode 500 may be transmitted by the PHY device 202 to a link partner via one or more channels and in one or both directions on the link 112. For example, the link partner may comprise the remote link partner 104 described with respect to FIG. 1. In this regard, the one or more channels and/or one or more directions of the PHY device 202 and/or the link partner may be operating in a low(er) power mode, for example, low power idle (LPI) mode. The refresh intervals 512 and/or 514 may comprise LPI idle frames and/or signals that may be utilized to maintain synchronization and/or refresh circuitry during LPI mode, for example.

In various embodiments of the invention, a different frame and/or different signal may be sent during the refresh interval 512 as opposed to the refresh interval 514. In this regard, transmission of different frames in consecutive and/or regular intervals may interrupt periodic signal elements during the low power mode 500. For example, the different LPI idle frames and/or signals may be chosen such that interfering frequency components that may be generated by a plurality of transmitted idle frames and/or signals during the refresh intervals 512 and 514 may be reduced. In this regard, interference may be reduced in active receivers of the PHY device 202, the link partner and/or other devices utilizing links near the link 112. The LPI idle frames and/or signals that may be sent during the refresh intervals 512 and/or 514 may be configurable and/or may be adaptable. Alternatively, the PHY device 202 may transmit different physical signals and/or different control characters during the refresh intervals 512 and/or 514 to reduce the interference. The PHY device 202 may utilize the different LPI idle frames and/or signals to reduce interference along with other methods for reducing interference that are described with respect to FIG. 3, FIG. 4, FIG. 6 and/or FIG. 7. In other embodiments of the invention, the refresh intervals 512 and/or 514 may comprise other types of frames and/or signals, for example, physical signals and/or depleted frames that may be utilized to maintain synchronization and/or refresh circuitry during the low power mode 500, for example.

Figure 6:
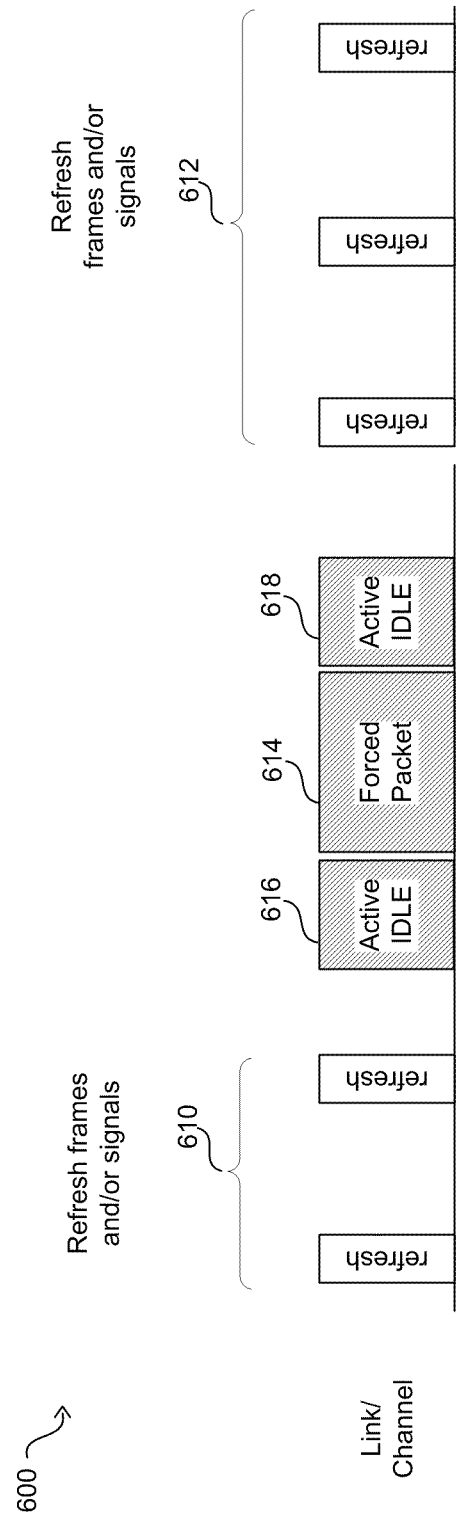
FIG. 6 is a block diagram illustrating exemplary refresh intervals and quiet intervals interrupted by a forced wake-up packet.

FIG. 6 is a block diagram illustrating exemplary refresh intervals and quiet intervals interrupted by a forced wake-up packet. Referring to FIG. 6, there is shown a low(er) power mode 600 comprising refresh frames and/or signals 610, refresh frames and/or signals 612, active idle frames 616 and 618 and a forced packet 614.

Refresh frames and or signals of the low(er) power mode 600 may be transmitted by the PHY device 202 to a link partner via one or more channels and/or in one or both directions on the link 112. For example, the link partner may comprise the remote link partner 104 described with respect to FIG. 1. In this regard, the one or more channels and/or one or more directions of the PHY device 202 and/or the link partner may be operating in a low(er) power mode, for example, low power idle (LPI) mode. In this regard, the refresh frames and/or signals 610 and/or 612 may be utilized to maintain synchronization and/or refresh circuitry during LPI mode, for example.

Various periodic elements of the refresh frames and/or signals 610 and 612 may introduce unwanted frequency components that may cause interference in the PHY device 202, the link partner and/or a device utilizing a link near the link 112. In this regard, the periodic elements of the refresh frames 610 and/or 612 may be interrupted by sending a forced packet 614 to and/or from the PHY device 202, thus, waking up the PHY device 202 and/or the link partner at least long enough to reduce unwanted interference from the refresh frames and/or signals 610. Active state idle signals may be sent prior to and/or after the forced packet 614 to wake-up the link partners. The forced packet 614 may be discarded by the PHY device 202 and/or may be sent to the link partner. The PHY device 202 and/or the link partner may resume transmitting and/or receiving the refresh frames and/or signals 612 after generation of the forced packet 614. Sending of the forced packet 614 may be configurable by a user and/or may be programmable. Furthermore, the PHY device 202 may utilize the forced packet 614 along with one or more other methods for reducing interference that are described with respect to FIG. 3, FIG. 4, FIG. 5 and/or FIG. 7. In other embodiments of the invention, the refresh intervals 610 and/or 612 may comprise other types of frames and/or signals, for example, physical signals and/or depleted frames that may be utilized to maintain synchronization and/or refresh circuitry during the low power mode 600, for example.

Figure 7:
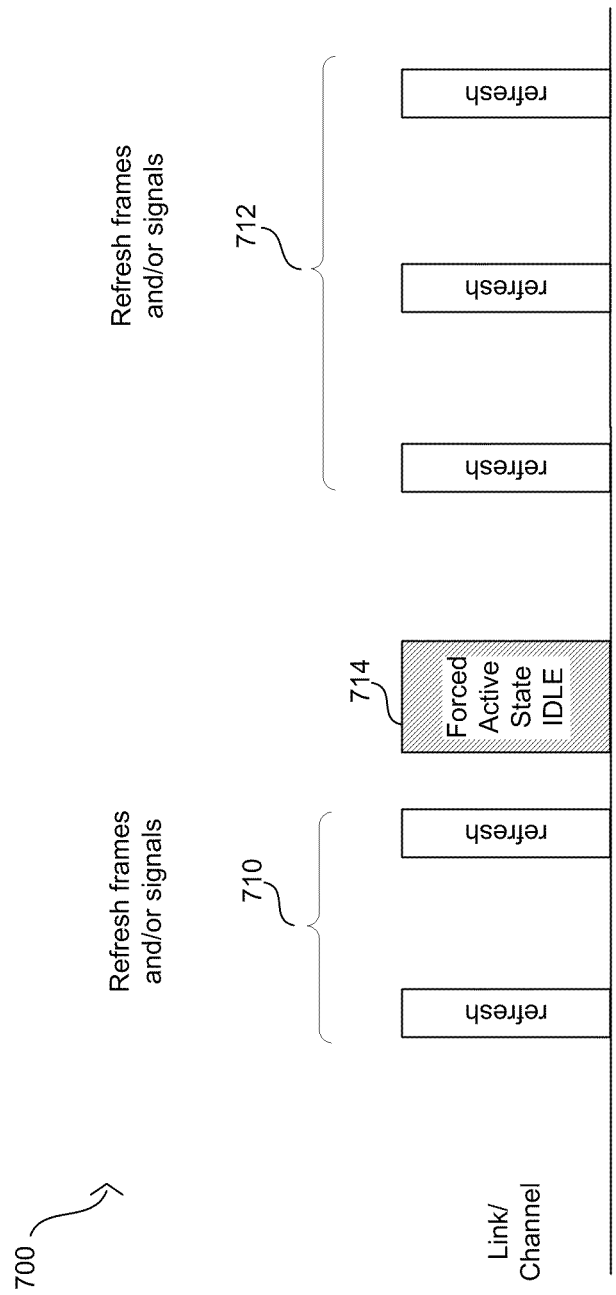
FIG. 7 is a block diagram illustrating exemplary refresh intervals and quiet intervals interrupted by a forced active state idle symbol.

FIG. 7 is a block diagram illustrating exemplary refresh intervals and quiet intervals interrupted by a forced active state idle symbol. Referring to FIG. 7, there is shown a low(er) power mode 700 comprising refresh frames and/or signals 710, refresh frames and/or signals 712 and a forced active state idle symbol 614.

The PHY device 202 may transmit refresh frames and or signals to a link partner via one or more channels and/or in one or both directions on the link 112 during the low(er) power mode 700. For example, the link partner may comprise the remote link partner 104 described with respect to FIG. 1. In this regard, the one or more channels and/or one or more directions of the PHY device 202 and/or the link partner may be operating in a low(er) power mode, for example, low power idle (LPI) mode. The refresh frames and/or signals 710 and/or 712 may be utilized to maintain synchronization and/or refresh circuitry during LPI mode, for example. Various periodic elements of the refresh frames and/or signals 710 and 712 may introduce unwanted frequency components that may cause interference in the PHY device 202, the link partner and/or a device utilizing a link near the link 112. In this regard, the periodic elements of the refresh frames 710 and/or 712 may be interrupted by sending a forced active state idle symbol 714 from the PHY device 202 to the link partner.

The active state idle symbol 714 may interrupt the periodic signal elements of the refresh frames and/or signals 710 and may reduce unwanted interference. The PHY device 202 and/or the link partner may resume transmitting and/or receiving the refresh frames and/or signals 612 after generation of the forced active state idle symbol 714. A time for sending the forced active state idle symbol 714 may be configurable or may be determined by software, firmware and/or hardware. Furthermore, the PHY device 202 may utilize the forced active state idle symbol 714 along with one or more other methods for reducing interference that are described with respect to FIG. 3, FIG. 4, FIG. 5 and/or FIG. 6.

Figure 8:
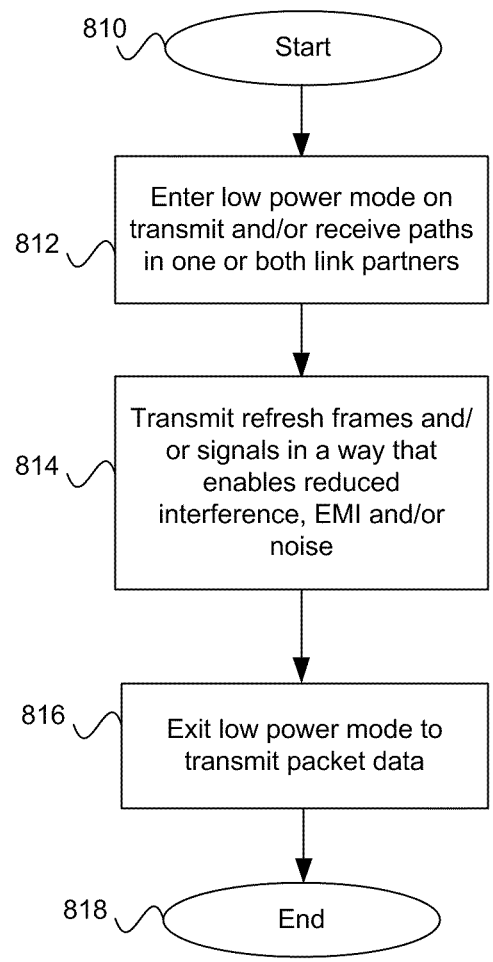
FIG. 8 is a flow chart illustrating exemplary steps for reducing noise that may be generated from refresh frames and/or signals comprising periodic frequency components, in accordance with an embodiment of the invention.

FIG. 8 is a flow chart illustrating exemplary steps for reducing noise that may be generated from refresh frames and/or signals comprising periodic frequency components, in accordance with an embodiment of the invention. The exemplary steps may begin with start step 810. In step 812, the PHY device 202 and/or a link partner such as the remote link partner 104 may enter low power mode on transmit and/or receive paths. In step 814, the PHY device 202 may transmit refresh frames and/or signals in a way that may enable reduced interference, EMI and/or noise. For example, the PHY device 202 may apply jitter to the refresh frames and/or signals. The PHY device 202 may send refresh frames and/or signals that may comprise spread and/or balanced spectral components. The PHY device 202 may vary refresh frames and/or signals that such that unwanted frequency components may be reduced. Moreover, the PHY device 202 may interrupt periodic elements of a plurality of refresh frames and/or signals by sending a forced packet or a forced active state idle symbol. In step 816, the PHY device 202 may return to an active state. Step 818 may be an end of the exemplary steps.

In an embodiment of the invention, link partners 102 and/or 104 in an Ethernet network that may be coupled via an Ethernet link 112 may enter a low power idl (LPI) mode of operation. During the LPI mode, one or more new frames and/or new signals may be generated. Furthermore, one or more characteristics of existing frames and/or existing signals may be modified. The generated new frames and/or signals and/or the modified existing frames and/or signals may be communicated by one or more of the link partners 102 and/or 104 over the Ethernet link 112. One or more of the link partners 102 and/or 104 may utilize the generated one or more new frames and/or new signals, and/or the modified one or more existing frames and/or existing signals to control communication over the Ethernet link 112 during the low power idle mode of operation. The generated one or more new frames and/or signals, and/or the modified one or more existing frames and/or signals may comprise LPI mode idle frames and/or LPI mode idle signals as shown in FIG. 3, FIG. 4 and/or FIG. 5. Moreover, the one or more link partners 102 and/or 104 may be enabled to synchronize and/or refresh one or more of their corresponding circuits, described with respect to FIG. 1 and/or FIG. 2 based on the generated one or more new frames and/or signals, and/or the modified one or more existing frames and/or signals.

Aspects of an exemplary embodiment of the invention may comprise mitigating periodic undesired energy in the existing frames and/or existing signals. In this regard, the generation of the new frames and/or new signals, and/or the modifying of existing frames and/or existing signals may be based on a desired frequency distribution and/or a spectral density. For example, jitter may be applied to the existing frames and/or existing signals, for example, as described with respect to FIG. 3. Moreover, the new frames and/or new signals and/or the modified existing frames and/or existing signals may comprise a random bit pattern and/or a pseudo random bit pattern as described with respect to FIG. 4, for example. Furthermore, bit patterns and/or energy levels among the generated one or more new frames and/or new signals, and/or the modified one or more existing frames and/or existing signals may be varied as described with respect to FIG. 5, for example. In an exemplary embodiment of the invention, one or more forced data packets and/or forced active idle symbols may be communicated over the Ethernet link 112 during the communication of the new frames and/or new signals and/or the modified existing frames and/or existing signal as described with respect to FIG. 6 and/or FIG. 7. Other exemplary aspects of the invention comprise configuring one or more of the link partners 102 and/or 104 for operation in the low power idle mode of operation. In this manner, circuitry that corresponds to an active channel, for example, 224b, may receive less noise from other channels, for example, 224a, 224c and/or 224d that may be operating in LPI mode.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for jitter and frame balance and/or rebalance for EEE refresh cycles.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
generating, by a first electronic device of a plurality of electronic devices that are coupled via an Ethernet link, a plurality of different types of refresh frames during a low power mode of operation of said first electronic device in which portions of said first electronic device are turned off or consume a reduced level of power when compared to an amount of power consumed during an active state of operation, wherein said different types of refresh frames are chosen to reduce interfering frequency components of a plurality of refresh frames transmitted during a plurality of refresh intervals.

2. The method according to claim 1, wherein
said plurality of different types of refresh frames that enable another one of said plurality of electronic devices to one or both of synchronize and refresh one or more of a corresponding circuit.

3. The method according to claim 1, further comprising:
mitigating periodic undesired energy in one or both of existing frames and existing signals during said low power mode.

4. The method according to claim 1, further comprising:
generating, during said low power mode, the refresh frames, based on one or both of a desired frequency distribution and spectral density.

5. The method according to claim 1, further comprising:
generating one or both of a random bit pattern and a pseudo random bit pattern for inclusion in said refresh frames during said low power mode.

6. The method according to claim 1, further comprising:
generating said refresh frames such that said refresh frames vary in one or both of bit patterns and energy levels during said low power mode.

7. The method according to claim 1, further comprising:
configuring said plurality of electronic devices for operation in said low power mode of operation.

8. The method according to claim 1, wherein said low power mode of operation utilizes one or more of forward error correction, time synchronization, precision clock synchronization and Ethernet security.

9. A system for communication, the system comprising:
a first electronic device; and
a second electronic device coupled to said first electronic device via an Ethernet link, wherein
said first electronic device is configured to
operate in a low power mode of operation in which portions of said first electronic device are turned off or consume a reduced level of power as compared to an amount of power consumed during an active state of operation;
generate a plurality of different types of refresh frames during said low power mode of operation; and
transmit said plurality of different types of refresh frames to said second electronic device via said Ethernet link, wherein
said different types of refresh frames are chosen to reduce interfering frequency components of a plurality of refresh frames transmitted during a plurality of refresh intervals.

10. The system according to claim 9, wherein said first and second electronic device is further configured to, during said low power mode,
modify one or more characteristics of said refresh frames; and
enable said second electronic device to one or both of synchronize and refresh one or more of their corresponding circuits.

11. The system according to claim 9, wherein said first electronic device is further configured to mitigate undesired periodic energy in said refresh frames.

12. The system according to claim 9, wherein said first electronic device is further configured to, during said low power mode, modify said one or more characteristics of said refresh frames based on one or both of a desired frequency distribution and spectral density.

13. The system according to claim 9, wherein said first electronic device is further configured to, during said low power mode,
modify one or more characteristics of at least one of said refresh frames to include one or both of a random bit pattern and a pseudo random bit pattern.

14. The system according to claim 9, wherein said first electronic device is further configured to, during said low power mode, vary one or both of bit patterns and energy levels of said refresh frames.

15. The system according to claim 9, wherein said first electronic device is further configured to communicate a forced data packet and/or a forced active idle symbol during communication of an existing frame, during said low power mode, over said one or more channels of said Ethernet link.

16. The system according to claim 9, wherein said first electronic device further configured to configure one or more of said link partners for operation in said low power mode of operation.

17. The system according to claim 9, wherein said control of said communication by said first and second electronic devices over one or more channels of said Ethernet link during said low power mode of operation utilizes one or more of forward error correction, time synchronization, precision clock synchronization and Ethernet security.

18. An electronic device comprising:
circuitry configured to:
control said electronic device to switch to a low power mode of operation in which portions of said electronic device are turned off or consume a reduced level of power when compared to an amount of power consumed during an active state of operation;
generate a plurality of different types of refresh frames during said low power mode of operation, said different types of refresh frames chosen to reduce interfering frequency components of a plurality of refresh frames transmitted during a plurality of refresh intervals; and
transmit said different types of refresh frames to another electronic device via an Ethernet link.

19. The electronic device according to claim 18, wherein said circuitry is further configured to, during said low power mode, modify one or more characteristics of said refresh frames based on one or both of a desired frequency distribution and spectral density.

20. The electronic device according to claim 18, wherein said circuitry is further configured to, during said low power mode, modify one or more characteristics of said refresh frames to include one or both of a random bit pattern and a pseudo random bit pattern.

21. The electronic device according to claim 18, wherein said circuitry is further configured to, during said low power mode, vary one or both of bit patterns and energy levels among said refresh frames.

* * * * *

UNITED STATES PATENT AND TRADEMARK OFFICE
CERTIFICATE OF CORRECTION

PATENT NO.        : 8,804,578 B2
APPLICATION NO.   : 12/493574
DATED             : August 12, 2014
INVENTOR(S)       : Wael William Diab et al.

Page 1 of 1

It is certified that error appears in the above-identified patent and that said Letters Patent is hereby corrected as shown below:

In the Claims

Column 15, line 12, delete "that" after "frames"

Column 16, line 26, add "is" after "electronic device"

Signed and Sealed this
Twenty-fourth Day of February, 2015

Michelle K. Lee
*Deputy Director of the United States Patent and Trademark Office*